(12) United States Patent
Sinha

(10) Patent No.: US 12,200,021 B2
(45) Date of Patent: Jan. 14, 2025

(54) CONTINUED PCMM SESSION ESTABLISHMENT

(71) Applicant: Charter Communications Operating, LLC, St. Louis, MO (US)

(72) Inventor: Ashutosh K. Sinha, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 438 days.

(21) Appl. No.: 17/518,625

(22) Filed: Nov. 4, 2021

(65) Prior Publication Data
US 2023/0139372 A1    May 4, 2023

(51) Int. Cl.
| H04L 65/1096 | (2022.01) |
| H04L 65/1045 | (2022.01) |
| H04L 65/1069 | (2022.01) |
| H04L 65/1076 | (2022.01) |

(52) U.S. Cl.
CPC ...... *H04L 65/1096* (2013.01); *H04L 65/1045* (2022.05); *H04L 65/1069* (2013.01); *H04L 65/1076* (2013.01)

(58) Field of Classification Search
CPC ............ H04L 65/1045; H04L 65/1096; H04L 65/1076; H04L 65/1069
USPC ....................................................... 370/259
See application file for complete search history.

(56) References Cited

U.S. PATENT DOCUMENTS

| 8,755,765 B2 | 6/2014 | Bakker et al. |
| 9,107,188 B2 | 8/2015 | Manpuria et al. |
| 9,231,876 B2 | 1/2016 | Mir et al. |
| 9,392,028 B2 | 7/2016 | George et al. |
| 10,187,924 B2 | 1/2019 | Bakker et al. |
| 2012/0110128 A1* | 5/2012 | Aaron ................. H04L 65/1069 709/219 |
| 2016/0029228 A1* | 1/2016 | Mufti .................... H04W 24/04 370/225 |

(Continued)

FOREIGN PATENT DOCUMENTS

EP    2 026 513 B1    8/2011

OTHER PUBLICATIONS

Cablelabs, "PacketCable™ Specification, Multimedia Specification, PKT-SP-MM-I07-151111", Nov. 11, 2015, 164 pages.

(Continued)

*Primary Examiner* — Ahmad F. Matar
*Assistant Examiner* — Jirapon Tulop
(74) *Attorney, Agent, or Firm* — THE MARBURY LAW GROUP, PLLC

(57) ABSTRACT

Various embodiments describe methods, systems, and devices for establishing a packet cable multi-media (PCMM) session. Exemplary implementations may receiving, a call initiation request message; determine whether a negative PCMM response associated with the call initiation request message is received; determine whether to ignore the negative PCMM response based on a call preferences parameter associated with the first UE in response to determining that the negative PCMM response is received; and establish a call associated with the call initiation request message in response to determining to ignore the negative PCMM response based on the call preferences parameter associated with the first UE.

23 Claims, 5 Drawing Sheets

(56) References Cited

U.S. PATENT DOCUMENTS

2016/0295252 A1* 10/2016 Karnik ............. H04N 21/64322

OTHER PUBLICATIONS

"P-CSCF is adding an extra paramater (i=1) in the via header field before forward the registration request to next hop", https://stackoverflow.com/questions/31309299/p-cscf-is-adding-an-extra-paramater-i-1-in-the-via-header-field-before . . . , 2 pages.

* cited by examiner

CONTINUED PCMM SESSION ESTABLISHMENT

BACKGROUND

Contemporary systems using proxy call session control functions (P-CSCF) are often unable to establish or maintain subscriber calls when a packet cable multi-media (PCMM) gives a negative response. A negative response may occur for various reasons such as an unavailability of resources (e.g., lack of available bandwidth or an overloaded system). In instances in which resources are insufficient, subscriber calls fail to get established.

SUMMARY

Various aspects include methods for a session initiation protocol (SIP) proxy to establish a packet cable multi-media (PCMM) session. One aspect of the present disclosure includes receiving, at the network computing device from a first user equipment (UE), a call initiation request message; determining, by the network computing device, whether a negative PCMM response associated with the call initiation request message is received; determining, by the network computing device, whether to ignore the negative PCMM response based on a call preferences parameter associated with the first UE in response to determining that the negative PCMM response is received; and establishing, by the network computing device, a call associated with the call initiation request message in response to determining to ignore the negative PCMM response based on the call preferences parameter associated with the first UE.

Some aspects include receiving, at the network computing device, a modification value associated with the call preferences parameter of the first UE, wherein the modification value changes the call preferences parameter to an active state that indicates the negative PCMM response should be ignored; and storing the received modification value to a cache for determining wherein the call preferences parameter is set to active as a default setting. The modification value associated with the call preferences parameter may be received from the first UE. The call preferences parameter associated with a plurality of user equipment may be set by default to indicate that the negative PCMM response should be ignored and associated calls established in response to determining that the negative PCMM response is received.

Some aspects include transmitting, to the first UE, a call preferences inquiry in response to determining that the negative PCMM response is received; and receiving, from the first UE, a modification value associated with the call preferences parameter of the first UE, wherein the modification value indicates that the negative PCMM response should be ignored and calls should be established in spite of a received negative PCMM response. The network computing device may be a proxy call session control function.

Some aspects include transmitting a call failure message to the first UE in response to determining that the negative PCMM response should not be ignored based on the call preferences parameter associated with the first UE. Some aspects include establishing, by the network computing device, the call associated with the call initiation request message in response to determining that the negative PCMM response associated with the call initiation request message is not received.

Further aspects may include a computing device having a processor configured to perform one or more operations of the methods summarized above. Further aspects may include a non-transitory processor-readable storage medium having stored thereon processor-executable instructions configured to cause a processor of a computing device to perform operations of the methods summarized above. Further aspects include a computing device having means for performing functions of the methods summarized above.

BRIEF DESCRIPTION OF THE DRAWINGS

The accompanying drawings, which are incorporated herein and constitute part of this specification, illustrate exemplary embodiments of the claims and together with the general description given above and the detailed description given below, serve to explain the features of the claims.

DETAILED DESCRIPTION

Figure 1:
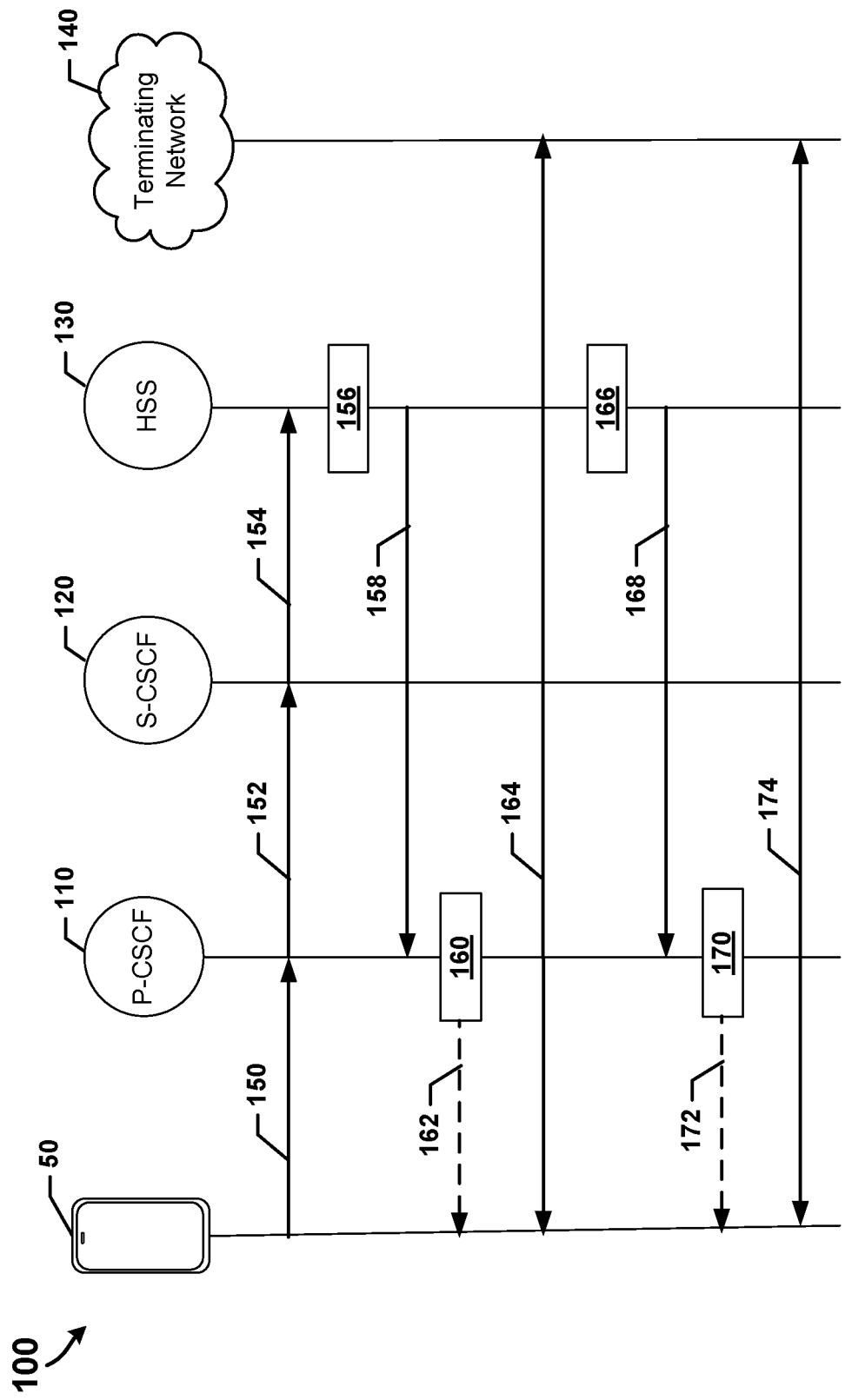
FIG. 1 illustrates an example communication flow diagram of a session initiation protocol (SIP) proxy establishing a packet cable multi-media (PCMM) session in accordance with various embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include methods, systems, and devices for establishing a PCMM session in a mobile communication network. To support telecommunication device signaling among mobile communication networks and with telephone networks, internet protocol multimedia subsystems (IMS) may use SIP. SIP may allow for the establishment, management, and termination of call sessions for end users without knowing the content of the call. A call session can be a simple telephone call between two users, or a multi-user multimedia conference.

Various embodiment methods disclosed herein may leverage mechanisms present in P-CSCF. P-CSCF is a session initiation protocol (SIP) proxy that is the first point of contact for user equipment (UE) in an IMS network. All SIP traffic to and from user equipment goes through the P-CSCF. Various embodiments introduce a new parameter flag into the P-CSCF. The new parameter flag may be referred to as a call continue preference indicator (CCPI). The CCPI flag is a call preferences parameter associated with a particular UE that may indicate whether call sessions should continue to be setup despite the receipt of a negative PCMM response. The CCPI may be a Boolean value (true or false). In instances in which the CCPI is set to true, the P-CSCF may be signaled to continue setting up a call session, without the cable modem termination system (CMTS) reserving bandwidth. In this way, the call session will proceed on a best effort basis. In instances in which the CCPI is set to false, the P-CSCF may behave as per the standard flow by aborting the session setup.

Various embodiments may ignore one or more error messages received from a P-CSCF and allow the call setup to continue regardless of call quality problems. Although this may result in poor call quality around 10% of the time, it still may be a more desirable outcome for some callers that have indicated a preference that the call (even when of poor quality) to be maintained rather than dropped. Also, around 90% of the time, the call quality will be acceptable and thus the caller may be happy to have the call established, rather than dropped.

As used herein, the term "user equipment," "computing device," or "network computing device" refers to an electronic device equipped with at least a processor, communication systems, and memory configured to initiate the deployment of live media content as a time-shifted playback and/or reduce the duplication of live media content stored by a computing device for later deployment as a time-shifted playback. Computing devices may include, but are not limited to, any one or all of personal computers, portable computing devices, rack mounted computers, routers, mobile devices, cellular telephones, smart phones, smart watches, smart buttons, smart appliances, personal or mobile multi-media players, personal data assistants (PDAs), tablet computers, smart books, palm-top computers, desk-top computers, wireless electronic mail receivers, cellular telephones, wireless gaming controllers, streaming media players (such as, ROKU®), smart televisions, DVRs, modems, satellite or cable set top boxes, smart remote control devices (i.e., television remote controls with sufficient processing capabilities), and similar electronic devices which include a programmable processor and memory and circuitry for providing the functionality described herein.

The various embodiments are described herein using the term "server" to refer to any computing device capable of functioning as a server, such as communications server, a name server, a master exchange server, web server, mail server, document server, database server, route server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server-type functionality that can be implemented on a computing device thereby enabling it to function as a server only to the extent necessary to provide the functionality described herein.

In accordance with various embodiments, a server such as a home subscriber server (HSS) may maintain new repository data (i.e., transparent data). Repository data may generally be one of two types; namely transparent and non-transparent. The transparent type is non-encrypted, such as plain text. The non-transparent type may be encrypted (e.g., base 64 encoded data). In various embodiments, the new repository data may be transparent (i.e., the non-encrypted type). The new repository data may store CCPI setting values for subscribers UEs. In this way, a subscriber may store as a CCPI value his/her preference relating to whether the subscriber desires a call setup and/or maintenance for his/her UE to be successful/maintained even in response to receiving a negative session response (i.e., during setup and/or mid-session). Negative session responses typically are the result of bandwidth reservation failures on the CMTS. In this way, the subscriber may elect to have calls established and/or maintained on a best effort basis, regardless of whether the established call may result in a call of poor call quality and/or experience for the subscriber. The HSS may cache Binary values reflecting each subscriber device's CCPI setting. For example, the CCPI may be set to an "active" or "inactive" state, based on subscriber preference. The active state may be associated with a particular UE's preference and may indicate to a P-CSCF that the subscriber wants call sessions to be established and maintained, even in response to receiving a negative PCMM response. In contrast, the inactive state may be associated with a particular UE's preference, but may indicate to a P-CSCF that the subscriber preference does not want call sessions to be established and maintained in response to receiving a negative PCMM response.

FIG. 1 illustrates an example communication flow diagram 100 for establishing or maintaining subscriber calls in response to receiving a negative PCMM response, in accordance with various embodiments. The communication flow diagram 100 shows communications between user equipment (UE) 50 of a subscriber and various network computing devices, including a P-CSCF 110, a serving call session control function (S-CSCF) 120, a home subscriber server (HSS) 130, and a terminating network 140, which may include one or more other servers or proxies configured to connect to at least one other UE.

Each of the various computing devices including the P-CSCF 110, a serving call session control function (S-CSCF) 120, a home subscriber server (HSS) 130, and a terminating network 140 may include electronic storage. The electronic storage may comprise non-transitory storage media that electronically stores information. The non-transitory storage media of the electronic storage may include one or both of system storage that may be provided integrally (i.e., substantially non-removable) and/or removable storage that may be removably connectable thereto via, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). Electronic storage may store software algorithms, information determined by processor(s), information received from the computing devices housing the electronic storage, as well as information received from other computing device(s), external resources and/or other information that enables the respective computing device to function as described herein.

A subscriber may use the UE 50 to connect to a communication network in various ways. The UE 50 may be any computing device (e.g., mobile phones, tablet computers, laptop computers, 2-in-1 computers, smart glasses, smart watches, other communication-enabled garments or accessories, personal digital assistants (PDAs) and other computing devices), which can register on an IMS, even when the UE may be roaming in another network or country (the visited network). The UE may use IP and run SIP user agents. Fixed access (e.g., digital subscriber line (DSL), cable modems, Ethernet, FTTx), mobile access (e.g. NR, LTE, W-CDMA, CDMA2000, GSM, GPRS) and wireless access (e.g., WLAN, WiMAX) may all be supported on the UE. Other phone systems like plain old telephone service (POTS—the old analogue telephones), H.323 and non IMS-compatible systems, may be supported on the UE through gateways.

The P-CSCF 110 and the S-CSCF 120 are SIP servers and/or proxies used to process SIP signaling packets in the IMS. The P-CSCF 110 is a SIP proxy that may be an edge node of the signaling plane. The P-CSCF 110 may function as the first point of contact for UE's in the IMS. The P-CSCF 110 may be located either in a visited network or in a home network. UE's may discover a particular P-CSCF 110 and use the particular P-CSCF 110 to access the IMS. The S-CSCF 120 may generally be a central node of the signaling plane that may perform session control. The S-CSCF 120 may interface with the HSS 130 to download user profiles and upload user-to-S-CSCF associations. Subscriber profile information for each UE 50 may be loaded to the P-CSCF 110 and the S-CSCF 120 from the HSS.

The HSS 130 may be a master user database that supports the IMS network entities that establish and support calls. The HSS 130 may contain the subscription-related information (subscriber profiles) for each UE 50, and may perform authentication and authorization of the subscriber and/or UE's, and may provide information about UE 50 location and IP information.

FIG. 1 illustrates a communication flow diagram 100 in which subscriber calls may be established even though a negative PCMM response is received. With reference to FIG. 1, in various embodiments, when initiating a call, the UE 50 may send a call initiation request message 150 to the P-CSCF 110. The call initiation request message 150 may be considered an 'Invite' containing the description of one or more measures for a call session (e.g., an initial session description protocol). For example, the call initiation request message 150 may include detailed information, such as in the session description protocol (SDP) header, which may include various elements, such as which audio/radio CODEC may be used for the call, which IP or ports may be used, and how much bandwidth may be required for uplink and/or downlink channels.

The P-CSCF 110 may then transmit a forwarding call initiation request message 152 to an S-CSCF 120. The particular S-CSCF 120 that is forwarded the call initiation request message 152 may be identified during a prior registration process. The forwarding call initiation request message 152 may be identical or virtually identical to the initial forwarded call initiation request message 150. In this way, the forwarding call initiation request message 152 may include information regarding preferences and desired call specifications requested by the UE 50. The system (i.e., the network) may include one or more interrogating call session control functions (I-CSCF) acting as an intermediary between the P-CSCF 110 and the S-CSCF 120 to pass messages there between.

The S-CSCF 120 may transmit a call establishment request 154 to the HSS 130 for the HSS 130 to establish parameters for the call session with the other UE (i.e., in the terminating network 140). The call establishment request 154 may request that the HSS 130 determine whether the UE 50 should be allowed to register and thus establish a call session with another UE in the terminating network 140. In this way, the P-CSCF 110 may attempt to reserve sufficient bandwidth to ensure a minimum required media bandwidth is reserved for the call based on the CODEC being used. In turn, the second UE (i.e., the other UE in the terminating network 140) may similarly exchange information with the HSS 130 and/or the first UE 50 for establishing the call, including CODEC information. Thus, the first UE 50 may ensure the exchanged information matches before completing all the steps of setting up and establishing the call.

In response receiving the call establishment request 154, the HSS 130 may perform call establishment operations 156. The call establishment operations 156 may compile information related to the call, such as information regarding available resources and other elements needed for establishing and maintaining the call. The compiled information related to the call may include a negative PCMM response in instances where the parameters and specifications identified in the call establishment request 154 may not be met with the currently available resources. For example, the following is an example of a Diameter Abort Session Request:

<AS-Request>::=<Diameter Header: 274, REQ, PXY>
   <Session-Id>
   {Origin-Host}
   {Origin-Realm}
   {Destination-Realm}
   {Destination-Host}
   {Auth-Application-Id}
   {Abort-Cause}
   [Origin-State-Id]
   *[Proxy-Info]
   *[Route-Record]
   *[AVP]

In the above example, the abort cause AVP indicated may have the following values:

INSUFFICIENT_SERVER_RESOURCES→associated with when server is overloaded; and
   INSUFFICIENT_BEARER_RESOURCES→associated with when server has insufficient bandwidth.

Another element of the compiled information may be that the subscriber of the UE 50 had previously registered the UE 50 to use an active value for the CCPI (i.e., a call preferences parameter configured to establish and/or maintain call sessions by ignoring negative PCMM responses). For example, by registering to use an active value for the CCPI, call sessions associated with the UE 50 may be established even in instances in which the currently available resources may not provide or reserve the desired media bandwidth. In other words, the active value for the CCPI set in a UE 50's preferences may signal the P-CSCF 110 to ignore negative PCMM responses for call requests associated with the UE 50. Thus, as part of the call establishment operations 156, the HSS 130 may access a table or database to check whether a CCPI value is associated with the UE 50. In instances in which a CCPI value is associated with the UE 50, to access the table or database to determine whether the CCPI value is active or inactive.

As part of or subsequent to the call establishment operations 156, the HSS 130 may send a call establishment response 158 (e.g., a SIP 200 OK message) to the P-CSCF 110 via the S-CSCF 120. The HSS 130 may include the CCPI value (e.g., active or inactive) in a SIP contact header of the call establishment response 158. The SIP contact header may generally include a single SIP uniform resource identifier (URI) that may be used to contact the sender of the invite for subsequent requests, but various embodiments may additionally include a value that reflects the CCPI elected by the subscriber. For example, the contact header with the CCPI parameter in the call establishment response 158 may read as follows:

Contact: <sip:user@host.example.com>;ccpi;expires=3600.

The portion that reads "expires=3600" is an example registration expiration time value. The presence of a CCPI parameter in the contact header may reflect whether the subscriber has selected the CCPI call continue preference indicator to be active or inactive. In contrast, a contact header that does not include the CCPI parameter in the call establishment response 158 may register as follows:

Contact: <sip:user@host.example.com>;expires=3600.

In accordance with various embodiments, in response to receiving the call establishment response 158, the P-CSCF 110 may cache the CCPI parameter (i.e., store in memory) for future call establishment for the UE 50, if included, as part of the call verification operations 160. Caching the CCPI value for the UE 50 may enable the P-CSCF 110 to determine whether negative PCMM responses for calls associated with the UE 50 may be ignored.

The call verification operations 160 may also include determining whether appropriate resources may be available to establish the call. In particular, the P-CSCF 110 may determine whether a negative PCMM response associated with the call initiation request message 150 is received (e.g., in the call establishment response). In response to determining that no negative PCMM response is received (i.e., appropriate resources are available to establish the call), call establishment procedures 164 may continue. However, the call establishment response 158 may include a negative PCMM response.

Conventional P-CSCF systems may let the call fail after determining that insufficient bandwidth or one or more other minimum quality of service (QOS) levels may not be maintained for the call. Minimum bandwidth and/or other QoS levels are usually designed to ensure callers/subscribers do not experience warbling, jitter, pixilation, and/or other signs of a poor call quality. However, in accordance with various embodiments, as part of the call verification operations 160, the P-CSCF 110 may determine whether to ignore a negative PCMM response based on the CCPI value (i.e., a call preferences parameter associated with the first UE), in response to determining that the negative PCMM response is received. In this way, the P-CSCF 110 may check the CCPI value cached in memory or whether a CCPI value is cached in memory. If no CCPI value or no active CCPI value is cached, the call may fail and a call failure message 162 may be transmitted to the UE 30. Otherwise, if a CCPI value is cached in memory and that CCPI value is an active CCPI value, which indicates negative PCMM responses may be ignored, then the call establishment procedures 164 may continue on a best effort basis to establish and maintain the requested call. As part of the call establishment procedures 164, the termination network 140 may send a message of type "offer response" to the S-CSCF 120. The message of type "offer response" may be relayed to the P-CSCF 110, authorizing the allocation of the resources necessary for the call session. The P-CSCF 110 may forward the "offer response" message back to the UE 50. The sending to the UE of the "offer response" message may confirm the receipt of the "offer response" message and the resource reservation may be started.

Thereafter, in instances in which a PCMM fails to reserve bandwidth on CMTS, the HSS 130 may compile an update 166. The compiled update 166 may be transmitted as a mid-session update 168 to the P-CSCF 110. The mid-session update 168 may include a negative PCMM response generated in response to updated network conditions (e.g., fewer resources available). Alternatively, the mid-session update 168 may include a change in the CCPI value as newly set or recently changed by the subscriber. In accordance with various embodiments, a subscriber may update and/or change the CCPI using a self-service portal. For example, the P-CSCF 110 may provide a call preferences modification function configured to allow the subscriber to change the CCPI cache. Alternatively, the CCPI may be changed by a network administrator as a regional or system-wide call establishment policy change.

As described above, in response to the P-CSCF 110 receiving the mid-session update 168, the P-CSCF 110 may perform a check 170 of the CCPI cache. In response to the CCPI cache indicating an "inactive" value or no value, the P-CSCF 110 may treat the call like a standard flow by aborting the call session and transmitting a call failure message 172. In response to the CCPI cache indicating an "active" value, the P-CSCF 110 may maintain the call 174 on a best effort basis, ignoring the negative PCMM response.

Figure 2A:
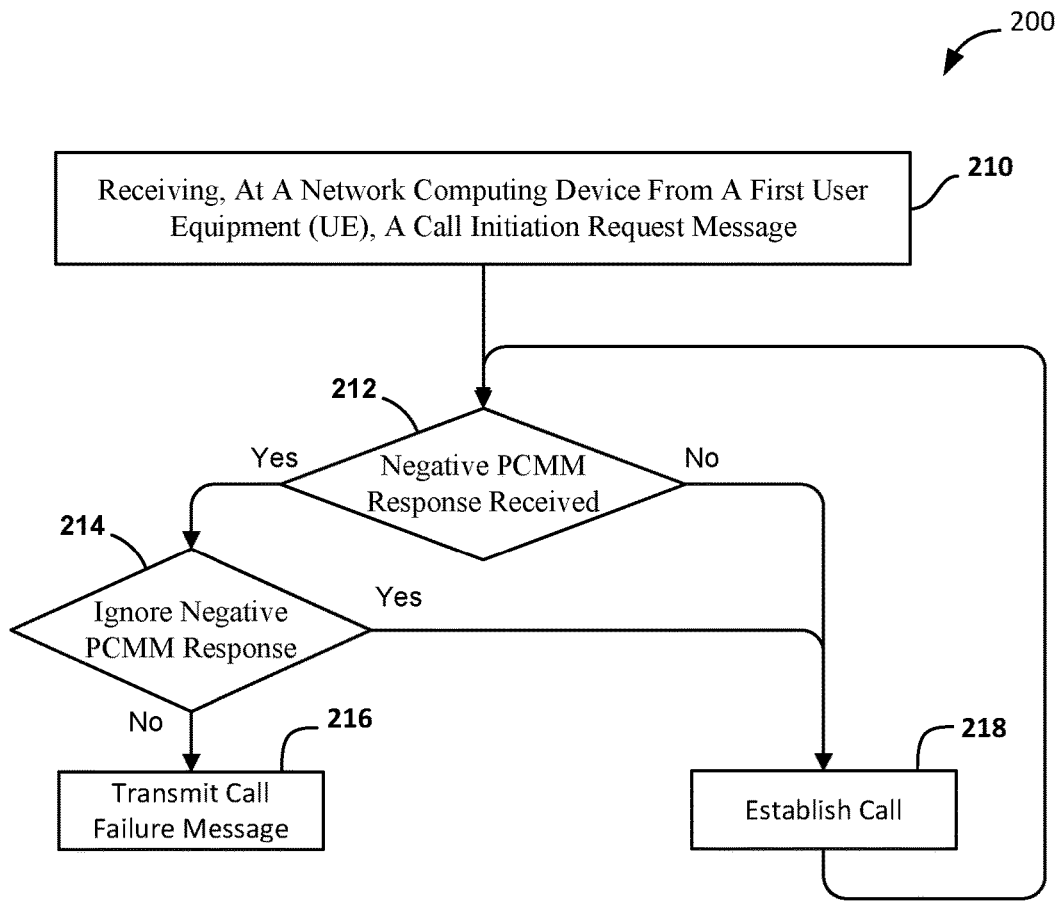
FIGS. 2A-2C are process flow diagrams illustrating embodiment methods for establishing a packet cable multi-media (PCMM) session suitable for use with various embodiments.
Figure 2B:
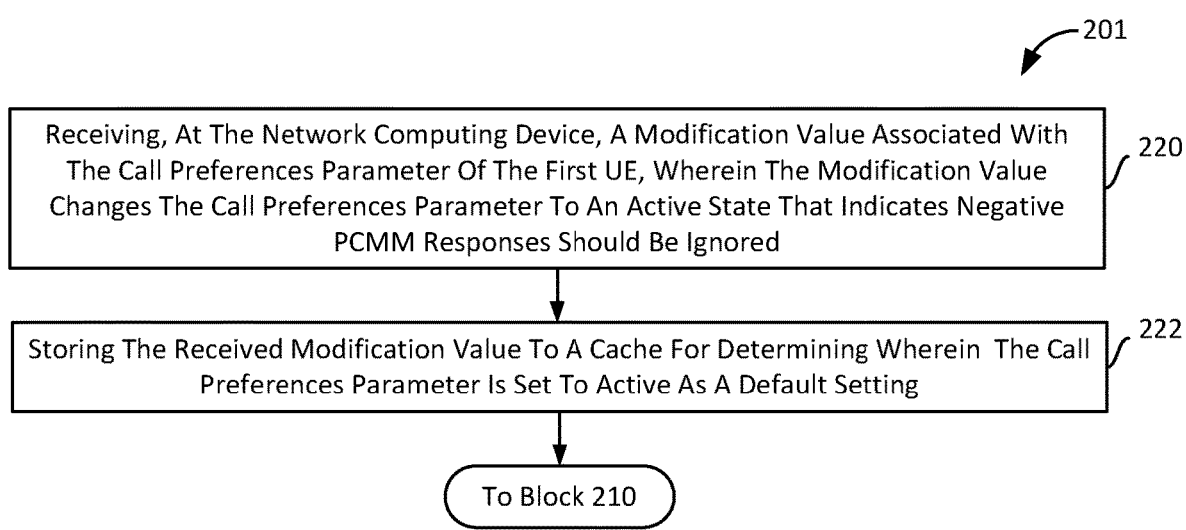
Figure 2C:
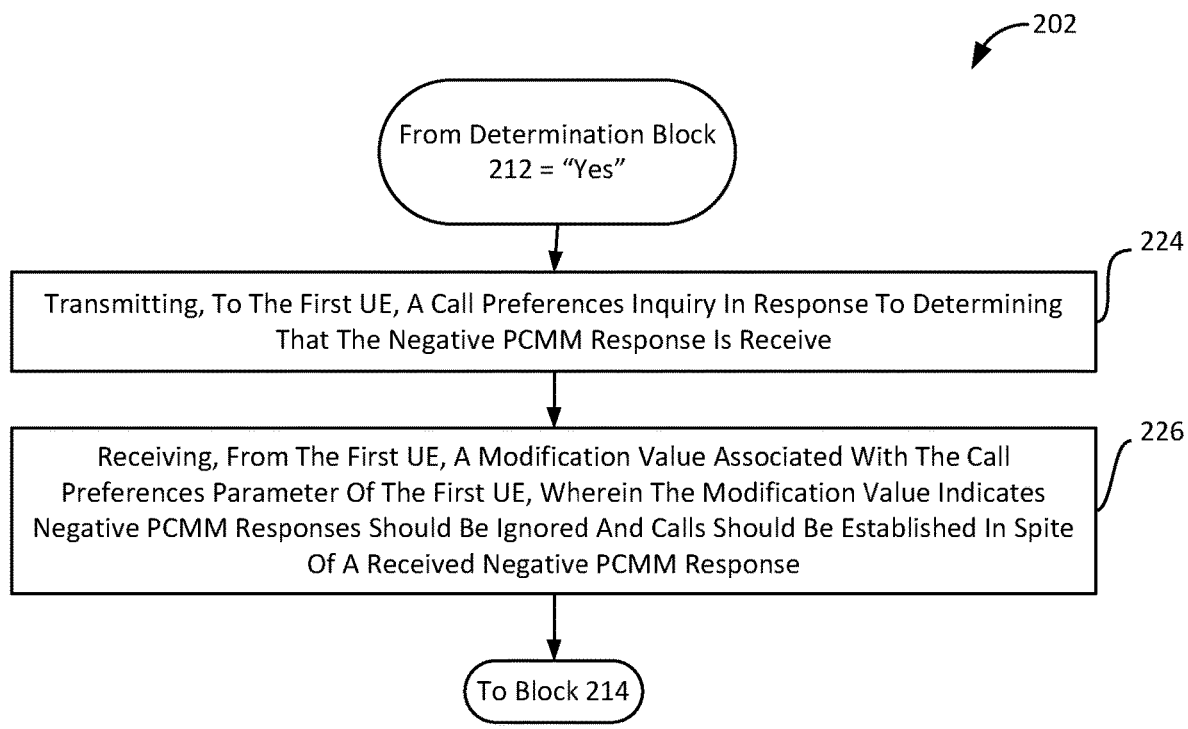

FIGS. 2A-2C illustrate operations of methods 200, 201, and 202 that may be implemented for establishing a PCMM session. The operations of the methods 200, 201, and 202 presented below are intended to be illustrative purposes only. In some embodiments, the methods 200, 201, and 202 may be accomplished with one or more additional operations not described, and/or without one or more of the operations discussed. Additionally, the order in which the operations of methods 200, 201, and 202 are illustrated in FIGS. 2A, 2B, and/or 2C and described below is not intended to be limiting.

Figure 3:
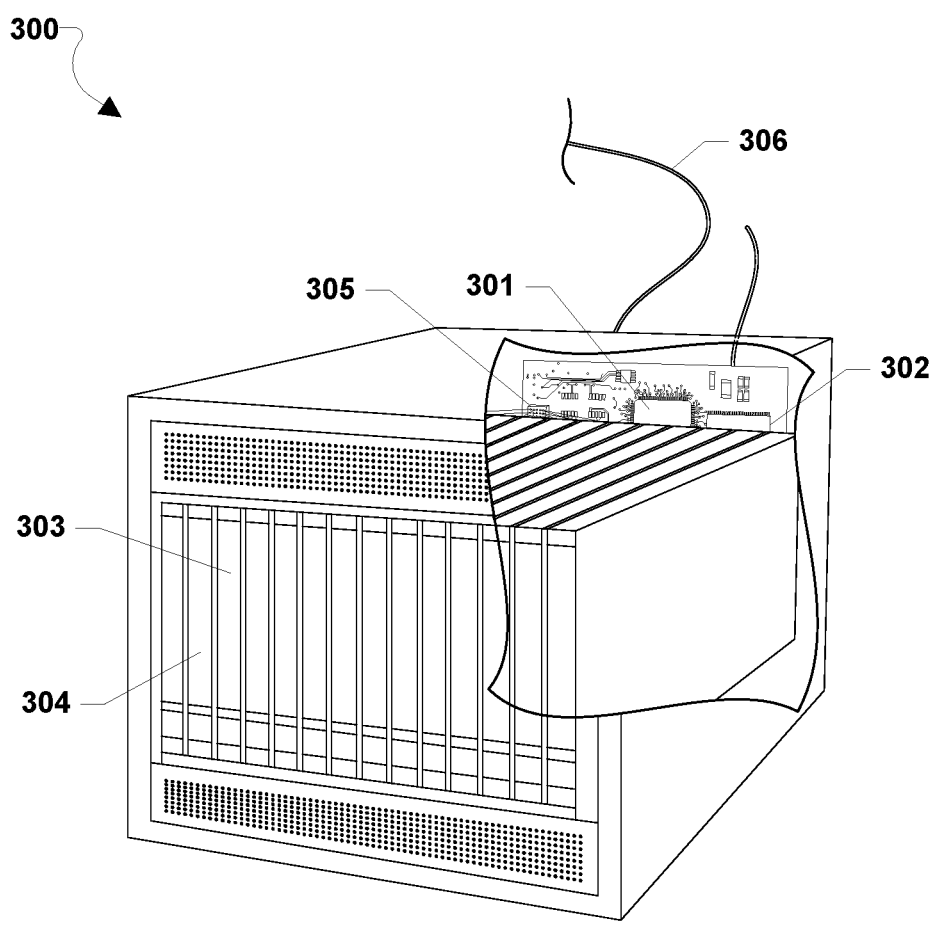
FIG. 3 is a component diagram of an example server suitable for use with the various embodiments.
Figure 4:
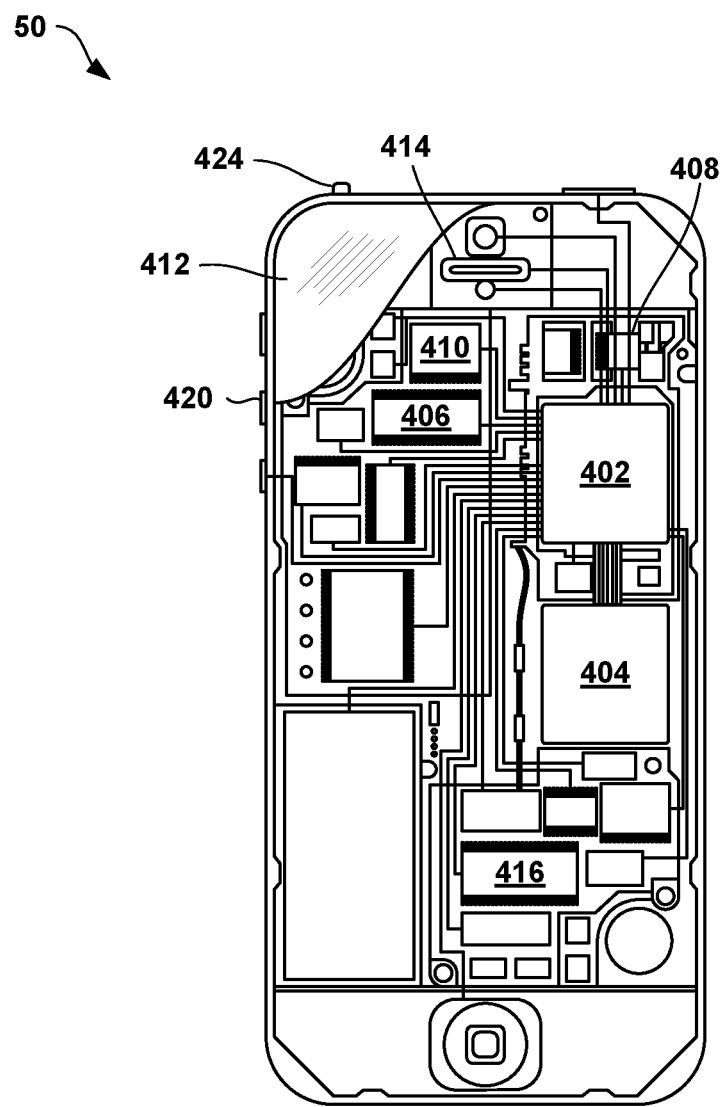
FIG. 4 is a component diagram of an example client computing device suitable for use with various embodiments.

In some embodiments, methods 200, 201, and 202 may be implemented in one or more processors (e.g., 301, 402, and 404 in FIGS. 3 and 4, respectively) in conjunction with memory (e.g., 302 and 406 in FIGS. 3 and 4). The one or more processor(s) may include one or more device(s) executing some or all of the operations of the methods 200, 201, and 202 in response to instructions stored electronically on an electronic storage medium. The one or more processor(s) may include one or more devices configured through hardware, firmware, and/or software to be specifically designed for execution of one or more of the operations of the methods 200, 201, and 202. For example, with reference to FIGS. 1-2C, the operations of the methods 200, 201, and 202 may be performed primarily or entirely by one or more processors in any one or more of a variety of network computing devices (e.g., the P-CSCF 110, S-CSCF 120, HSS 130, and/or one or more computing devices in the terminating network 140 in FIG. 1).

FIG. 2A illustrates the method 200, in accordance with one or more embodiments. In block 210, the processor may receive, from a first UE (e.g., UE 50), a call initiation request message (e.g., 150). The call initiation request message received in block 210 may be received by one or more processors through a transceiver (e.g., 305 in FIG. 3). As a non-limiting example, the processor of the P-CSCF 110 server may receive call initiation request message from a UE 50, which may be a cellular telephone making a call to another UE. In various embodiments, the reception of the call initiation request message in block 210 may be performed primarily or entirely by one or more processors in any one or more of a variety of network computing devices (e.g., P-CSCF 110, S-CSCF 120, HSS 130, and/or one or more computing devices in the terminating network 140) using a transceiver (e.g., 305 in FIG. 3).

In determination block 212, the processor may determine whether a negative PCMM response is received, wherein the negative PCMM response is associated with the call initiation request message received in block 210. As a non-limiting example, the processor may determine a negative PCMM response is received when the HSS (e.g., 130) indicates that minimum bandwidth specifications may not be met by available resources. In various embodiments, the determination in determination block 212 may be performed primarily or entirely by one or more processors in any one or more of a variety of network computing devices (e.g., P-CSCF 110, S-CSCF 120, HSS 130, and/or one or more computing devices in the terminating network 140).

In response to the processor determining that a negative PCMM response is not received (i.e., determination block 212="No"), the processor may establish a call associated with the call initiation request message (e.g., 150) in block 218. In response to the processor determining that a negative PCMM response is received (i.e., determination block 212="Yes"), the processor may determine whether to ignore the negative PCMM response based on a call preferences parameter (e.g., CCPI) associated with the first UE in determination block 214. As a non-limiting example, the processor may determine whether a negative PCMM response is received by checking a call establishment response (e.g., SIP 200 OK message) received from the HSS. In various embodiments, the determination block 212 may be performed primarily or entirely by one or more processors in any one or more of a variety of network computing devices (e.g., P-CSCF 110, S-CSCF 120, HSS 130, and/or one or more computing devices in the terminating network 140).

In determination block 214, the processor may determine whether to ignore the negative PCMM response based on a call preferences parameter (e.g., CCPI) associated with the first UE. The call preferences parameter may be associated with a particular UE and the parameter may indicate whether call sessions should continue to be setup in spite of receiving a negative PCMM response. As a non-limiting example, the processor may make this determination by checking whether a call preferences parameter for the particular UE (e.g., UE 50) is stored in cache (e.g., memory 302), In instances in which a call preferences parameter for the particular UE (e.g., UE 50) is stored in cache (e.g., memory 302), the processor may determine what that stored call preferences parameter indicates. In this way, the processor may determine that whether a call preferences parameter is stored in cache. The stored call preference parameter may designate an active or inactive response to negative PCMM responses, which the processor may interpret accordingly. Additionally, the processor may determine that no call preferences parameter is stored in cache. In such instances the processor may assume negative PCMM responses should not be ignored. Alternatively, in some embodiments, the processor may determine that no call preferences parameter is stored in cache. They may interpret the lack of a call preference stored in cache to be an indication that negative PCMM responses should be ignored. In some embodiments, the call preferences parameter associated with a plurality of user equipment may be set by default to indicate negative PCMM responses should be ignored and associated calls established in response to determining that a negative PCMM response is received.

In response to the processor determining that the negative PCMM response should be ignored based on a call preferences parameter associated with the first UE (i.e., determination block 214="Yes"), the processor may establish a call associated with the call initiation request message (e.g., 150) in block 218. In response to the processor determining that the negative PCMM response should not be ignored based on a call preferences parameter associated with the first UE (i.e., determination block 214="No"), the processor may transmit a call failure message in block 216.

In various embodiments, the determination in determination block 214 may be performed primarily or entirely by one or more processors in any one or more of a variety of network computing devices (e.g., P-CSCF 110, S-CSCF 120, HSS 130, and/or one or more computing devices in the terminating network 140).

In some embodiments, the processor may repeat the operations in blocks 210, 216, or 218 or determination blocks 212 or 214 to periodically or continuously establish a PCMM session.

FIG. 2B illustrates the method 201, in accordance with one or more embodiments. In block 220, the processor of the network computing device may receive a modification value associated with the call preferences parameter of the first UE, wherein the modification value changes the call preferences parameter to an active state that indicates negative PCMM responses should be ignored. As a non-limiting example, the processor may receive the modification value associated with the call preferences parameter as part of a CCPI value received as part of a call establishment response (e.g., 158 in FIG. 1) from an HSS (e.g., 130). The HSS may encode the CCPI value in a contact header of a SIP 200 OK message. In some embodiments, the modification value associated with the call preferences parameter may be received from the first UE.

In block 222, in response to receipt by the processor of the received modification value in block 220, the processor may store the received modification value to a cache for determining whether the call preferences parameter is set to active as a default. In various embodiments, the storing of the received modification value in block 222 may be performed primarily or entirely by one or more processors in any one or more of a variety of network computing devices (e.g., P-CSCF 110, S-CSCF 120, HSS 130, and/or one or more computing devices in the terminating network 140) in conjunction with memory (e.g., 302 and 406 in FIGS. 3 and 4).

Following receipt by the processor of the modification value in block 220 and storing that same value in block 222, the processor may perform the operations in block 210 as described above with regard to the method 200. In some embodiments, the processor may repeat the operations in blocks 210, 216, 218, 220, and 222 and determination blocks 212 and 214 to periodically or continuously establish a PCMM session.

FIG. 2C illustrates the method 202, in accordance with one or more embodiments. In block 224, following the operations of the method 200 in which determination block 212 equals "Yes" (i.e., in response to the processor determining that the negative PCMM response is received) the processor may transmit, to the first UE (e.g., 50), a call preferences inquiry. The transmitted call preferences inquiry may seek input from the subscriber through the UE as to how the subscriber would like the call the be handled. As a non-limiting example, the subscriber may be queried as to whether a negative PCMM response should be ignored, such that the call session gets established using best efforts techniques. In this way, the subscriber may selectively decide whether negative PCMM responses should be ignored for calls. In various embodiments, the processor may transmit the call preferences inquiry to the UE (e.g., 50). In various embodiments, the transmission of the call preferences inquiry in block 224 may be performed primarily or entirely by one or more processors in any one or more of a variety of network computing devices (e.g., P-CSCF 110, S-CSCF 120, HSS 130, and/or one or more computing devices in the terminating network 140) using a transceiver (e.g., 305 in FIG. 3).

In block 226, the processor may receive from the first UE (e.g., 150) a modification value associated with the call preferences parameter of the first UE, wherein the modification value indicates negative PCMM responses should be ignored and calls should be established in spite of a received negative PCMM response. In various embodiments, the reception of the call preferences parameter in block 226 may be performed primarily or entirely by one or more processors in any one or more of a variety of network computing devices (e.g., P-CSCF 110, S-CSCF 120, HSS 130, and/or one or more computing devices in the terminating network 140) using a transceiver (e.g., 305 in FIG. 3). Following the operations in block 226, the processor may perform the operations in block 218 as described above with regard to the method 200. In some embodiments, the processor may repeat the operations in blocks 210, 216, 218, 224, and 226 and determination blocks 212 and 214 to periodically or continuously establish a PCMM session.

The various embodiments (including, but not limited to, embodiments discussed above with reference to FIGS. 1-2C) may be implemented on any of a variety of network computing devices (e.g., the P-CSCF 110, S-CSCF 120, HSS 130, a network computing device in the terminating network 140, or other computing device), an example of which is illustrated in FIG. 3 in the form of a server 300. With reference to FIGS. 1-3, the server 300 may include a processor 301 coupled to volatile memory 302. The server 300 may also include one or more connections or port(s) 306 coupled to the processor 301 and configured to input and/or output data from the port(s) 308. The server 300 may storage hard disks 303, 304. The server 300 may also include one or more network transceivers 305, with one or more antenna 306 coupled thereto, providing a network access port, coupled to the processor 301 for establishing wired or wireless network interface connections with a communication network, such as a local area network coupled to other computing devices and routers/switches, the Internet, the public switched telephone network, and/or a cellular network (e.g., CDMA, TDMA, GSM, PCS, 3G, 4G, LTE, or any other type of cellular network). The server 300 may transmit and/or receive data or other communications via the network transceiver 305 and/or the port(s) 308.

Various embodiments (including, but not limited to, embodiments discussed above with reference to FIGS. 1-2C) may be implemented on or in conjunction with a variety of computing devices, an example of which is illustrated in FIG. 4 in the form of a client computing device 50. With reference to FIGS. 1-4, the client computing device 50 may include a first system-on-chip (SoC) 402 (e.g., a SoC-CPU) coupled to a second SoC 404 (e.g., a 5G capable SoC), such as D2D links establish in the dedicated ITS 5.9 GHz spectrum communications. The first and/or second SOCs 402, 404 may be coupled to internal memory 406, a display 412, and to a speaker 414. Additionally, the client computing device 50 may include one or more antenna 424 for sending and receiving electromagnetic radiation that may be connected to one or more wireless transceivers 408 (e.g., a wireless data link and/or cellular transceiver, etc.) coupled to one or more processors in the first and/or second SOCs 402, 404. Client computing devices 50 may also include menu selection buttons or rocker switches 420 for receiving user inputs.

Client computing devices 50 may additionally include a sound encoding/decoding (CODEC) circuit 410, which digitizes sound received from a microphone into data packets suitable for wireless transmission and decodes received sound data packets to generate analog signals that are provided to the speaker to generate sound. Also, one or more of the processors in the first and/or second SOCs 402, 404, wireless transceiver 408 and CODEC circuit 410 may include a digital signal processor (DSP) circuit (not shown separately).

The processors 301, 402, and 404 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 301, 402, and 404. The processors 301, 402, and 404 may include internal memory sufficient to store the application software instructions. In many devices, the internal memory may be a volatile or nonvolatile memory, such as flash memory, or a mixture of both. For the purposes of this description, a general reference to memory refers to memory accessible by the processors 301, 402, and 404 including internal memory or removable memory plugged into the device and memory within the processors 301, 402, and 404 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a module may be, but is not limited to, a process running on a processor, a processor, an object, an executable, a thread of execution, a program, or a computer. By way of illustration, both an application running on a computing device and the computing device may be referred to as a module. One or more modules may reside within a process or thread of execution and a module may be localized on one processor or core or distributed between two or more processors or cores. In addition, these modules may execute from various non-transitory processor-readable storage media having various instructions or data structures stored thereon. Modules may communicate by way of local or remote processes, function or procedure calls, electronic signals, data packets, memory read/writes, and other known network, computer, processor, or process related communication methodologies.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module and/or processor-executable instructions, which may reside on a non-transitory computer-readable or non-transitory processor-readable storage medium. Non-transitory server-readable, computer-readable or processor-readable storage media may be any storage media that may be accessed by a computer or a processor. By way of example but not limitation, such non-transitory server-readable, computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of the above are also included within the scope of non-transitory server-readable, computer-readable and processor-readable storage media. Additionally, the operations of a method or algorithm may reside as one or any combination or set of codes and/or instructions on a non-transitory server-readable, processor-readable medium and/or computer-readable storage medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method executed by a processor of a network computing device for establishing a packet cable multimedia (PCMM) session, comprising:
   receiving, by the network computing device from a user equipment (UE), a modification value associated with a call preferences parameter associated with the UE, wherein the modification value changes the call preferences parameter to an active state that indicates a negative PCMM response should be ignored;
   storing the received modification value in a cache;
   receiving, at the network computing device from the UE, a call initiation request message;
   determining, by the network computing device, whether the negative PCMM response associated with the call initiation request message is received;
   determining, by the network computing device, whether to ignore the negative PCMM response based on the call preferences parameter associated with the UE changed by the received modification value stored in the cache in response to determining that the negative PCMM response is received; and
   establishing, by the network computing device, a call associated with the call initiation request message in response to determining to ignore the negative PCMM response based on the call preferences parameter associated with the UE.

2. The method of claim 1, wherein the network computing device is a proxy call session control function.

3. The method of claim 1, further comprising:
   establishing, by the network computing device, the call associated with the call initiation request message in response to determining that the negative PCMM response associated with the call initiation request message is not received.

4. A method executed by a processor of a network computing device for establishing a packet cable multimedia (PCMM) session, comprising:
   receiving, by the network computing device from a user equipment (UE), a call initiation request message;
   determining, by the network computing device, whether a negative PCMM response associated with the call initiation request message is received;
   transmitting, to the UE, a call preferences inquiry in response to determining that the negative PCMM response is received;
   receiving, from the UE, a modification value associated with the call preferences parameter of the UE, wherein the modification value indicates whether the negative PCMM response should be ignored and calls should be established in spite of the received negative PCMM response;
   determining, by the network computing device, whether to ignore the negative PCMM response based on the received modification value; and
   establishing, by the network computing device, a call associated with the call initiation request message in response to determining to ignore the negative PCMM response.

5. The method of claim 4, wherein the call preferences parameter associated with the UE is set by default to indicate that the negative PCMM response should be ignored and associated calls established in response to determining that the negative PCMM response is received.

6. The method of claim 4, wherein the network computing device is a proxy call session control function.

7. The method of claim 4, further comprising:
transmitting a call failure message to the UE in response to determining that the negative PCMM response should not be ignored based on the call preferences parameter associated with the UE.

8. The method of claim 4, further comprising:
establishing, by the network computing device, the call associated with the call initiation request message in response to determining that the negative PCMM response associated with the call initiation request message is not received.

9. A network computing device comprising:
a transceiver; and
a processor coupled to the transceiver, wherein the processor is configured with processor-executable instructions to perform operations for establishing a packet cable multi-media (PCMM) session, comprising:
receiving, from a user equipment (UE), a modification value associated with a call preferences parameter associated with the UE, wherein the modification value changes the call preferences parameter to an active state that indicates the negative PCMM response should be ignored;
storing the received modification value in a cache;
receiving, from the UE, a call initiation request message;
determining whether the negative PCMM response associated with the call initiation request message is received;
determining whether to ignore the negative PCMM response based on the call preferences parameter associated with the UE changed by the received modification value stored in the cache in response to determining that the negative PCMM response is received, wherein the call preferences parameter is configurable by a user of the UE; and
establishing a call associated with the call initiation request message in response to determining to ignore the negative PCMM response based on the call preferences parameter associated with the UE.

10. The network computing device of claim 9, wherein the processor is configured with processor-executable instructions to perform operations such that the network computing device is a proxy call session control function.

11. The network computing device of claim 9, wherein the processor is configured with processor-executable instructions to perform operations further comprising:
establishing the call associated with the call initiation request message in response to determining that the negative PCMM response associated with the call initiation request message is not received.

12. A network computing device, comprising:
a transceiver; and
a processor coupled to the transceiver, wherein the processor is configured with processor-executable instructions to perform operations for establishing a packet cable multi-media (PCMM) session, comprising:
receiving, from a user equipment (UE), a call initiation request message;
determining whether a negative PCMM response associated with the call initiation request message is received;
transmitting, to the UE, a call preferences inquiry in response to determining that the negative PCMM response is received;
receiving, from the UE, a modification value associated with a call preferences parameter of the UE, wherein the modification value indicates whether the negative PCMM response should be ignored and calls should be established in spite of the received negative PCMM response;
determining whether to ignore the negative PCMM response based on the received modification value; and
establishing, by the network computing device, a call associated with the call initiation request message in response to determining to ignore the negative PCMM response.

13. The network computing device of claim 12, wherein the processor is configured with processor-executable instructions to perform operations such that the call preferences parameter is set by default to indicate that the negative PCMM response should be ignored and associated calls established in response to determining that the negative PCMM response is received.

14. The network computing device of claim 12, wherein the processor is configured with processor-executable instructions to perform operations such that the network computing device is a proxy call session control function.

15. The network computing device of claim 12, wherein the processor is configured with processor-executable instructions to perform operations further comprising:
transmitting a call failure message to the UE in response to determining that the negative PCMM response should not be ignored based on the call preferences parameter associated with the UE.

16. The network computing device of claim 12, wherein the processor is configured with processor-executable instructions to perform operations further comprising:
establishing the call associated with the call initiation request message in response to determining that the negative PCMM response associated with the call initiation request message is not received.

17. A non-transitory processor-readable storage medium having stored thereon processor-executable instructions configured to cause a processor of a network computing device to perform operations for establishing a packet cable multi-media (PCMM) session, comprising:
receiving, by the network computing device from a user equipment (UE), a modification value associated with a call preferences parameter associated with the UE, wherein the modification value changes a call preferences parameter to an active state that indicates a negative PCMM response should be ignored;
storing the received modification value in a cache;
receiving, by the network computing device from the UE, a call initiation request message;
determining, by the network computing device, whether a negative PCMM response associated with the call initiation request message is received;
determining, by the network computing device, whether to ignore the negative PCMM response based on the call preferences parameter associated with the UE changed by the received modification value stored in the cache in response to determining that the negative PCMM response is received; and
establishing, by the network computing device, a call associated with the call initiation request message in response to determining to ignore the negative PCMM response based on the call preferences parameter associated with the UE.

18. The non-transitory processor-readable storage medium of claim 17, wherein the stored processor-executable instructions are configured to cause the processor of the network computing device to perform operations such that the network computing device is a proxy call session control function.

19. The non-transitory processor-readable storage medium of claim 17, wherein the stored processor-executable instructions are configured to cause the processor of the network computing device to perform operations further comprising:

establishing, by the network computing device, the call associated with the call initiation request message in response to determining that the negative PCMM response associated with the call initiation request message is not received.

20. A non-transitory processor-readable storage medium having stored thereon processor-executable instructions configured to cause a processor of a network computing device to perform operations for establishing a packet cable multi-media (PCMM) session comprising:

receiving, from a user equipment (UE), a call initiation request message;

determining whether a negative PCMM response associated with the call initiation request message is received;

transmitting, to the UE, a call preferences inquiry in response to determining that the negative PCMM response is received;

receiving, from the UE, a modification value associated with a call preferences parameter of the UE, wherein the modification value indicates whether the negative PCMM response should be ignored and calls should be established in spite of the received negative PCMM response;

determining whether to ignore the negative PCMM response based on the received modification value; and establishing a call associated with the call initiation request message in response to determining to ignore the negative PCMM response.

21. The non-transitory processor-readable storage medium of claim 20, wherein the stored processor-executable instructions are configured to cause the processor of the network computing device to perform operations such that the call preferences parameter is set by default to indicate that the negative PCMM response should be ignored and associated calls established in response to determining that the negative PCMM response is received.

22. The non-transitory processor-readable storage medium of claim 20, wherein the stored processor-executable instructions are configured to cause the processor of the network computing device to perform operations further comprising:

transmitting a call failure message to the UE in response to determining that the negative PCMM response should not be ignored based on the call preferences parameter associated with the UE.

23. The non-transitory processor-readable storage medium of claim 20, wherein the stored processor-executable instructions are configured to cause the processor of the network computing device to perform operations further comprising:

establishing, by the network computing device, the call associated with the call initiation request message in response to determining that the negative PCMM response associated with the call initiation request message is not received.

* * * * *